United States Patent
Kim et al.

(10) Patent No.: US 10,139,683 B2
(45) Date of Patent: Nov. 27, 2018

(54) METHOD OF CUTTING LIQUID CRYSTAL DISPLAY PANEL

(71) Applicant: Samsung Display Co., Ltd., Yongin-si, Gyeonggi-Do (KR)

(72) Inventors: Min Su Kim, Seoul (KR); Jang-Hyun Kim, Hwaseong-si (KR); Tae Wook Kang, Seongnam-si (KR); Tae Woon Cha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 569 days.

(21) Appl. No.: 14/742,400

(22) Filed: Jun. 17, 2015

(65) Prior Publication Data

US 2016/0018682 A1 Jan. 21, 2016

(30) Foreign Application Priority Data

Jul. 21, 2014 (KR) .................... 10-2014-0092003

(51) Int. Cl.
*G02F 1/1339* (2006.01)
*G02F 1/1333* (2006.01)

(52) U.S. Cl.
CPC ...... *G02F 1/1339* (2013.01); *G02F 1/133351* (2013.01)

(58) Field of Classification Search
None
See application file for complete search history.

(56) References Cited

U.S. PATENT DOCUMENTS

| | | | | |
|---|---|---|---|---|
| 5,851,411 A * | 12/1998 | An | ...... | G02F 1/13336 216/23 |
| 6,236,446 B1 * | 5/2001 | Izumi | ...... | C03B 33/091 219/121.67 |
| 2005/0118921 A1 * | 6/2005 | Jung | ...... | G02F 1/133351 445/24 |
| 2006/0151450 A1 * | 7/2006 | You | ...... | C03B 33/093 219/121.67 |
| 2007/0195255 A1 * | 8/2007 | Cho | ...... | G02F 1/133351 349/153 |
| 2012/0196071 A1 * | 8/2012 | Cornejo | ...... | B28D 1/00 428/43 |
| 2012/0325392 A1 * | 12/2012 | Zennyoji | ...... | G02F 1/1337 156/60 |

FOREIGN PATENT DOCUMENTS

| | | |
|---|---|---|
| KR | 10-0689314 B1 | 2/2007 |
| KR | 10-2012-0067207 A | 6/2012 |
| KR | 10-2012-0119082 A | 10/2012 |
| KR | 10-2005-0113919 A | 12/2015 |

* cited by examiner

*Primary Examiner* — Edward Glick
*Assistant Examiner* — David Chung
(74) *Attorney, Agent, or Firm* — H.C. Park & Associates, PLC

(57) ABSTRACT

A mother substrate assembly according to an exemplary embodiment of the present invention includes: a first mother substrate and a second mother substrate formed with a plurality of unit liquid crystal panels; and a sealant formed between the first mother substrate and the second mother substrate and combining the mother substrates, wherein the sealant encloses a circumference of each unit liquid crystal panel, and includes a first irradiation line formed in the sealant, and a second irradiation line formed in the sealant of a side closer to the unit liquid crystal panel than the first irradiation line.

18 Claims, 28 Drawing Sheets

(a)

(b)

METHOD OF CUTTING LIQUID CRYSTAL DISPLAY PANEL

CLAIM OF PRIORITY

This application claims priority to and the benefit of Korean Patent Application No. 10-2014-0092003 filed in the Korean Intellectual Property Office on Jul. 21, 2014, the entire contents of which are incorporated herein by reference.

BACKGROUND OF THE INVENTION

1. Field of Disclosure

The present invention relates to a cutting method of a liquid crystal panel.

2. Description of the Related Art

Recently, displays visually processing and displaying a large amount of information have been quickly developed according to advances of the information age, and in response to this trend, various flat panel displays have been developed and spotlighted.

As examples of the flat panel displays, there are a liquid crystal display (LCD), a plasma display panel (PDP), a field emission display (FED), and an electroluminescent display (ELD), and these flat panel displays having excellent characteristics such as thinness, light weight, and low power consumption have thus replaced the existing cathode ray tube.

Among them, particularly, the liquid crystal display has a large contrast ratio, is suitable for motion picture display, and has low power consumption, thereby being activated in various fields such as for a laptop, a monitor, and a TV. An image realization principle thereof uses optical anisotropy of the liquid crystal and a polarization property, and in this case, the liquid crystal has a molecular structure that is elongated and the arrangement thereof has a directional property as the optical anisotropy and the polarization property such that the molecular alignment direction is changed according to the magnitude of an electric field in which the liquid crystal is disposed.

That is, the general liquid crystal display has a liquid crystal panel including first and second substrates formed with an array layer for liquid crystal driving, a color filter layer for color realization, and a liquid crystal layer interposed between the first and second substrates as essential constituent elements, and changes the arrangement direction of the liquid crystal molecules by the electric field therein, thereby generating a transmittance difference.

The transmittance difference of the liquid crystal panel is reflected with a color combination of the color filters through light of a backlight disposed at a rear surface of the liquid crystal panel, thereby being displayed with a color image shape.

Here, a manufacturing process of the general liquid crystal display is classified into a substrate manufacturing process to obtain the first and second substrates, a cell process to complete the liquid crystal panel, and a module process of integrating the liquid crystal panel and the backlight.

Among them, the cell process is generally executed for first and second large-area substrates in which a plurality of cell regions are divided for each position for an effect of process shortening or yield improvement.

Accordingly, in the substrate manufacturing process, for each of the first and second large-area substrates, thin film positioning, a photo-lithography process, an etching step, and the like are repeated several times to realize pixels and thin film transistors for each cell region.

In this case, in the cell process, a sealant for substrate combination is formed at the cell region of one among the first and second large-area substrates and the two substrates are combined to face to each other via the liquid crystal layer interposed therebetween, and then cutting is performed for each cell region to obtain a plurality of liquid crystal panels.

The cutting process of cutting the large-area substrate into a plurality of unit substrates is realized through a substrate cutting system using a scribing device as a separate cutting system.

The substrate cutting system may use a scribing unit to form a scratch of a line shape by scribing the substrate for each cell region by using a wheel and a breaking unit substantially cutting the large-area substrate to form a plurality of unit substrates.

On the other hand, recently, the display device has been actively applied to a personal portable electronic device such as a mobile phone, a PDA as well as a TV or a monitor, and in the case of the small display device, it is required to form the display region to be enlarged and a bezel region as a non-display region to be small as well as to have low weight and a thin thickness.

Accordingly, in the cutting process of cutting the large-area substrate into a plurality of unit substrates, the liquid crystal panel must be designed and cut to realize the low weight, the thin thickness, and the narrow bezel of the liquid crystal display.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a cutting method of a liquid crystal panel that minimizes a bezel, prevents a crack of an incision surface, and prevents a gas from flowing into a display area.

A mother substrate assembly according to an exemplary embodiment of the present invention includes: a first mother substrate and a second mother substrate formed with a plurality of unit liquid crystal panels; and a sealant formed between the first mother substrate and the second mother substrate and combining the mother substrates, wherein the sealant encloses a circumference of each unit liquid crystal panel, and includes a first irradiation line formed in the sealant, and a second irradiation line formed in the sealant of a side closer to the unit liquid crystal panel than the first irradiation line.

The first irradiation line and the second irradiation line may be empty spaces in which the sealant is removed or spaces in which the sealant is partially removed or damaged such that adherence with the mother substrate is lost.

The first irradiation line and the second irradiation line may be straight lines parallel to the unit liquid crystal panel.

A third irradiation line formed in the sealant of a side closer to the unit liquid crystal panel than the first irradiation line, and the second irradiation line may be further included.

The second irradiation line may be a straight line parallel to each edge of the unit liquid crystal panel, and the first irradiation line may be perpendicular to the second irradiation line and may be a plurality of short lines formed in a direction from the center of the sealant toward the circumference of the sealant.

The first irradiation line may include a plurality of disconnected points formed along the edge of the sealant, and the second irradiation line may be a straight line parallel to each edge of the unit liquid crystal panel.

A mother substrate assembly according to an exemplary embodiment of the present invention includes: a first mother substrate and a second mother substrate formed with a plurality of unit liquid crystal panels; and a sealant formed between the first mother substrate and the second mother substrate and combining the mother substrates, wherein the sealant encloses a circumference of each unit liquid crystal panel and is completely removed or partially removed in an area from a center of the sealant to an edge farther from the unit liquid crystal panel such that adherence with the mother substrate is lost.

A mother substrate assembly according to another exemplary embodiment of the present invention includes: a first mother substrate and a second mother substrate formed with a plurality of unit liquid crystal panels; and a sealant formed between the first mother substrate and the second mother substrate and combining the mother substrates, wherein the sealant encloses a circumference of each unit liquid crystal panel, and includes a first irradiation line starting from an edge of the sealant, repeating with a zigzag pattern to a center of the sealant, and progressing along a formation direction of the sealant.

A distance from the sealant to the second irradiation line may be less than 0.3 mm.

A cutting method of a liquid crystal panel according to an exemplary embodiment of the present invention includes: combining a first mother substrate and a second mother substrate formed with a plurality of unit liquid crystal panels by a sealant; firstly irradiating a laser to the sealant; secondly irradiating the laser to a region closer to the unit liquid crystal panel than a position of the first laser irradiation of the sealant; and cutting the combined mother substrate along the second laser irradiation region.

The sealant may enclose each unit liquid crystal panel, and the mother substrate may be divided into a display area inside the sealant and a dummy region outside the sealant.

After the first laser irradiation, the sealant of the region irradiated by the laser may be removed to form an empty space or may be partially removed such that adherence between the sealant and the mother substrate is lost.

The gas generated in the first laser irradiation may be discharged to the dummy region.

The first laser irradiation may be formed of a linear shape along a progressing direction of the sealant, and the direction of the first laser irradiation and the direction of the second laser irradiation may be parallel to each other.

The method may further include after the first laser irradiation and prior to the second laser irradiation, additionally irradiating the laser to the region closer to the unit liquid crystal panel than the position of the first laser irradiation of the sealant. The position of the second laser irradiation of the sealant may be closer to the unit liquid crystal panel than the position of the additional laser irradiation.

The first laser irradiation may progress in a direction from the center of the sealant toward the circumference of the sealant, the second laser irradiation may be performed in a direction perpendicular to the first laser irradiation along the progressing direction of the sealant, and after the laser irradiation, a groove of a shape such as a comb may be formed in a direction from the center of the sealant farther from the liquid crystal panel.

The first laser irradiation may be performed to produce an island shape along the progressing direction for the sealant, after the first laser irradiation, a circle groove of the island shape may be continuously formed along the progressing direction of the sealant in the sealant, and the second laser irradiation may be performed in the direction parallel to the progressing direction of the groove of the island shape formed through the first laser irradiation.

A width of the sealant remained in the cut liquid crystal panel may be less than 0.3 mm.

A cutting method of a liquid crystal panel according to another exemplary embodiment of the present invention includes: providing a first mother substrate and a second mother substrate formed with a plurality of unit liquid crystal panels; combining the first mother substrate and the second mother substrate by a sealant enclosing each unit liquid crystal panel and dividing the mother substrate into a display area inside the sealant and a dummy region outside the sealant; removing the sealant with a laser having a wider width than a width from a center of the sealant to the dummy region; and cutting the combined mother substrate along the removed sealant.

The laser irradiation may use the laser starting from the dummy region outside the sealant and repeating in a right and left pattern to the center of the sealant.

As described above, the cutting method of the panel according to an exemplary embodiment of the present invention cuts the region in which the sealant is formed, thereby minimizing the length of the bezel. Also, by removing the sealant under the region where the cutting wheel passes through the laser irradiation, the crack generation of the incision surface by the adherence of the sealant and the mother substrate may be prevented. Also, by firstly forming the empty space through the laser irradiation at the region close to the dummy region of the sealant, the gas generated when irradiating the laser to the sealant may be prevented from flowing inside the display area.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
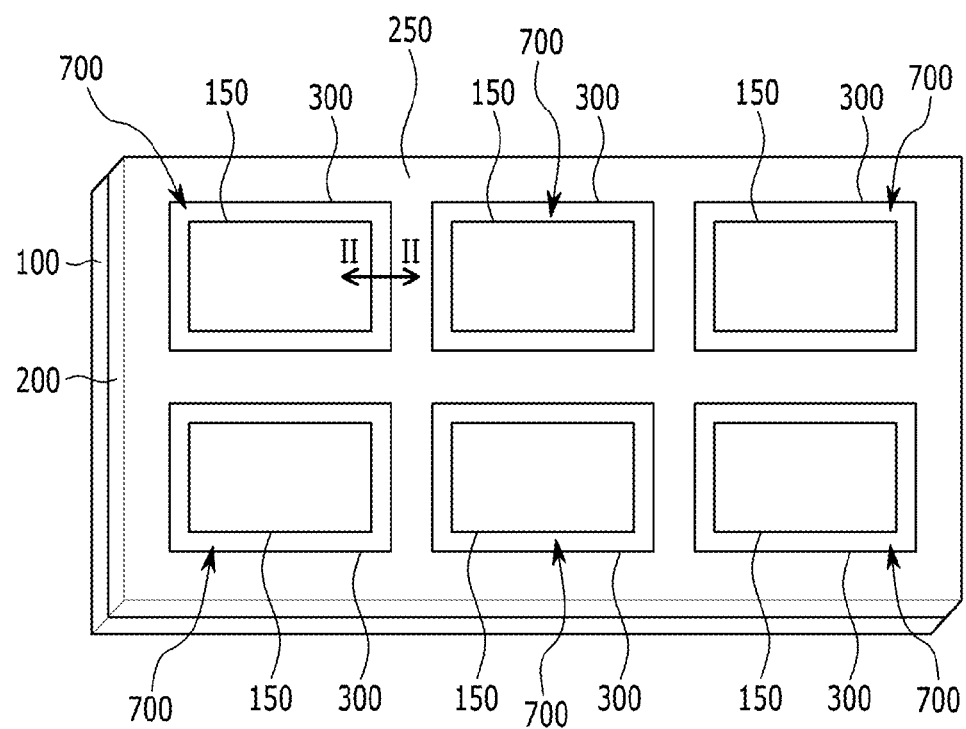
FIG. 1 is a view of a mother substrate assembly according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a cutting method of a liquid crystal panel according to an exemplary embodiment of the present invention will be described with reference to accompanying drawings.

A cutting method of a liquid crystal panel according to an exemplary embodiment of the present invention includes combining a first mother substrate and a second mother substrate formed with a plurality of unit liquid crystal panels by a sealant.

FIG. 1 is a view of a mother substrate assembly according to an exemplary embodiment of the present invention. The mother substrate assembly of FIG. 1 are combined with a first mother substrate 100 and a second mother substrate 200 in which a plurality of unit liquid crystal panels 700 are formed by a sealant 300.

Referring to FIG. 1, a plurality of unit liquid crystal panels 700 are formed in the first mother substrate 100 and the second mother substrate 200, and the sealant 300 is formed at a circumference of each unit liquid crystal panel 700.

Each unit liquid crystal panel 700 is used as a separate liquid crystal panel after the cutting process. In FIG. 1, one mother substrate is formed with six liquid crystal panels; however one mother substrate may be configured with eight liquid crystal panels or more.

Although not shown, in one unit liquid crystal panel 700 of the first mother substrate 100, a plurality of gate lines and data lines are crossed to define pixels, and a thin film transistor (TFT) is provided at each crossing point and is connected in one-to-one correspondence to a transparent pixel electrode formed in each pixel.

Also, although not shown in the corresponding second mother substrate 200, a color filter of red (R), green (G), and blue (B) colors corresponding to each pixel is formed, and for example, the color filter and a black matrix enclosing the color filter and covering the gate line, the data line, and the thin film transistor are formed. Also, a transparent common electrode covering the color filter of red (R), green (G), and blue (B) colors and the black matrix may be provided. However, the color filter, the black matrix, or the common electrode may be positioned in the first mother substrate 100.

The sealant 300 is formed between the first mother substrate 100 and the second mother substrate 200 while enclosing the circumference of each liquid crystal panel 700. The sealant 300 may be formed by an ultraviolet ray hardening sealant, a thermal hardening sealant, or a sealant mixed with the ultraviolet ray hardening sealant and the thermal hardening sealant. The sealant is coated and hardened by applying ultraviolet rays or heat, such that the first mother substrate 100 and the second mother substrate 200 are combined by the sealant 300.

The sealant 300 is formed according to the circumference of each unit liquid crystal panel 700, thereby dividing the combined mother substrate assembly into a plurality of display areas 150 and a dummy region 250. Each display area 150 is a region of a liquid crystal panel 700 with the pixel electrode 190 (shown in FIG. 2), thereby being the region in which the image is actually displayed, and the dummy region 250 is a region in which the pixel electrode 190 does not exist and is removed after the cutting.

Figure 2:
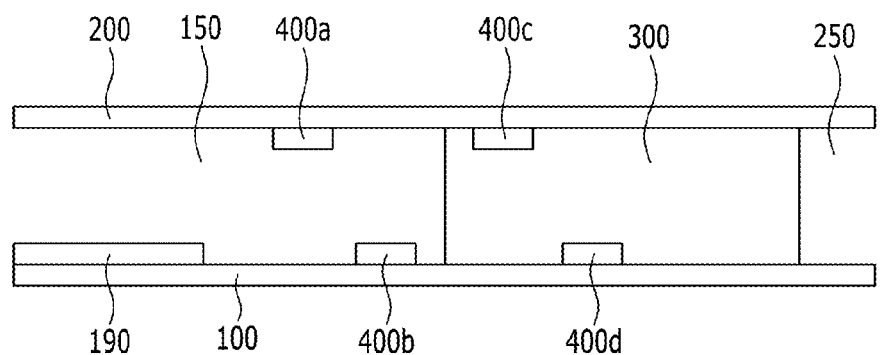
FIG. 2 is a cross-sectional view of the mother substrate assembly of FIG. 1 taken along a line II-II.

FIG. 2 is a cross-sectional view of the mother substrate assembly of FIG. 1 taken along a line II-II. Referring to FIG. 2, the sealant 300 is deposited between the first mother substrate 100 and the second mother substrate 200. The sealant 300 divides the mother substrate assembly into the display area 150 and the dummy region 250, and the pixel electrode 190 is formed in the first mother substrate 100. In FIG. 2, only the pixel electrode 190 is shown, however the first mother substrate may actually have the structure of a general thin film transistor array panel.

A plurality of dams 400a, 400b, 400c, and 400d may exist between the pixel electrode 190 and the sealant 300. The dam prevents a fluid resin deposited inside the display area 150 for example, the liquid crystal, from being leaked outside. That is, the dam may be barrier that prevents a fluid of the fluid material from leaking.

Referring to FIG. 2, the sealant 300 may be formed to include a portion of the dam.

The cutting method of the liquid crystal panel according to an exemplary embodiment of the present invention may include firstly irradiating the laser to the sealant.

Figure 3:
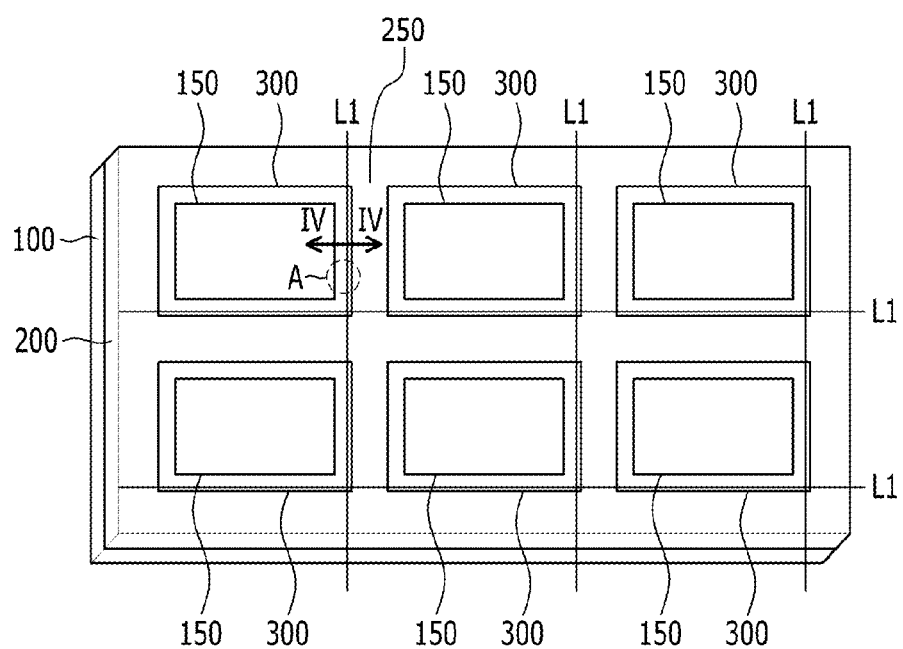
FIG. 3 is a view of a mother substrate assembly firstly irradiated with a laser.
Figure 4:
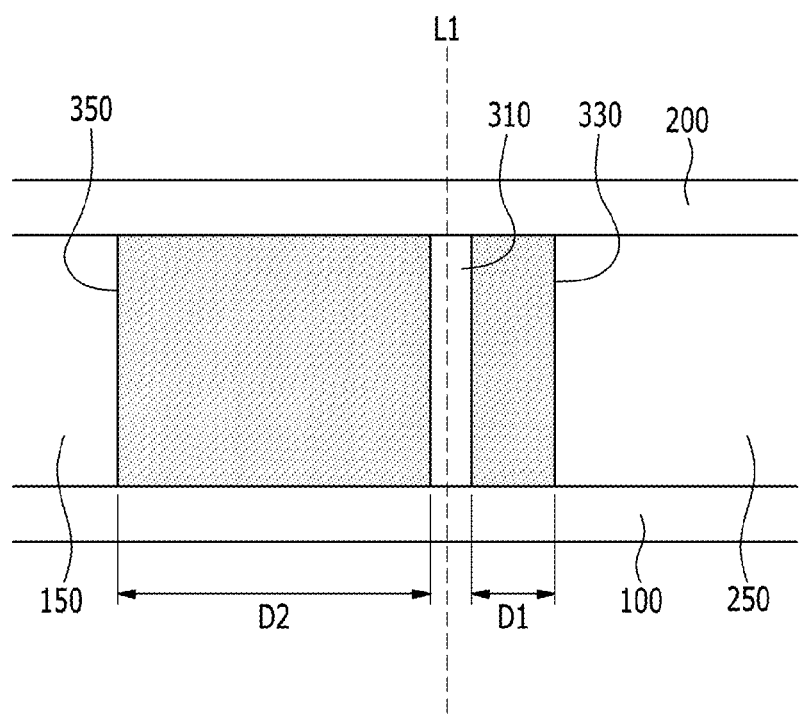
FIG. 4 is a cross-sectional view of the mother substrate assembly of FIG. 3 taken along a line IV-IV.
Figure 5:
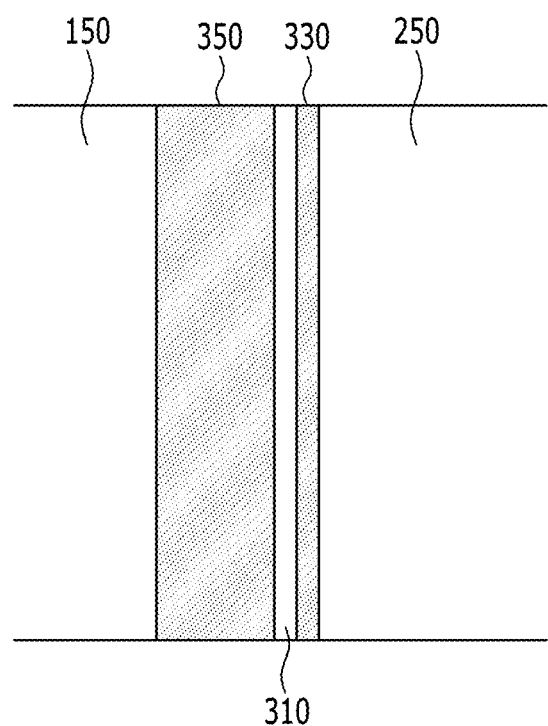
FIG. 5 is an enlarged view of a region A of FIG. 3.

FIG. 3 is a view of a mother substrate assembly firstly irradiated with a laser. FIG. 4 is a cross-sectional view of the mother substrate assembly of FIG. 3 taken along a line IV-IV. FIG. 5 is an enlarged view of a region A of FIG. 3.

Referring to FIG. 3, in this step, the laser is irradiated to the sealant of the region near the dummy region in a straight line with reference to a center of the sealant. In this case, the used laser may be a UV region, a visible light region, or an infrared region.

The first laser irradiation, as shown in FIG. 3, may form a continuous line, or may form a shape that is not continuous but is disconnected such as a dotted line. The various methods of the first laser irradiation will be described later in another exemplary embodiment.

By the first laser irradiation, the sealant of the portion irradiated with the laser is removed. Referring to FIG. 4, after the laser is irradiated to the sealant, a portion of the sealant is removed by the laser and a first space 310 is generated by the removed sealant, and the sealant 300 is converted to a first sealant portion 330 and a second sealant portion 350. The first space 310 is positioned between the first sealant portion 330 and the second sealant portion 350. A width D1 of the first sealant portion 330 which is immediately adjacent to the dummy region 250, is less than that a width D2 of the second sealant portion 350 which is immediately adjacent to the display region 150.

In this case, a gas is generated in the removal process of the portion of the sealant 300 located at the first space 310. This gas is generated from the first space 310, but since the first space is positioned to be closer to the dummy region 250 than to the display area 150, the gas is only emitted to the dummy region 250.

That is, in the cutting method of the liquid crystal panel according to the present exemplary embodiment, the first laser irradiation is performed at the region close to the dummy region 250 of the sealant 300. FIG. 5 is the view of the first space 310 formed on the first laser irradiation of the sealant on the top.

In FIG. 4 and FIG. 5, the sealant is completely removed to generate the empty space; however the sealant may not be completely removed according to the output of the laser and the process conditions. However, in this case, the sealant of the portion that contacts the first mother substrate 100 and the second mother substrate 200 is partially removed or damaged such that it is no longer adhered to the mother substrate assembly.

Figure 6:
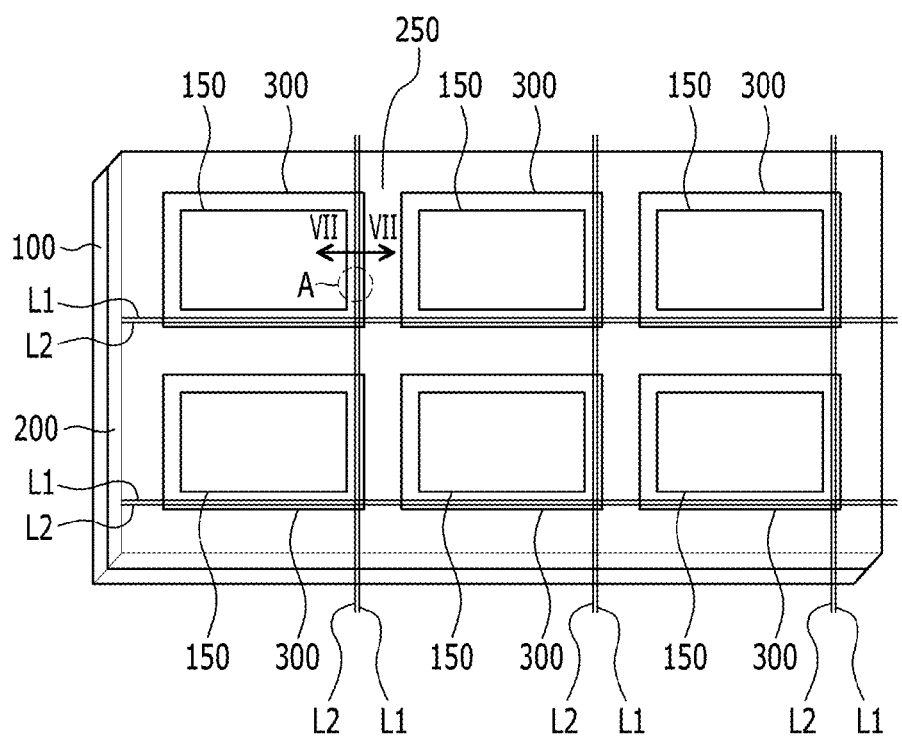
FIG. 6 is a view of a mother substrate assembly that is secondly irradiated with a laser.
Figure 7:
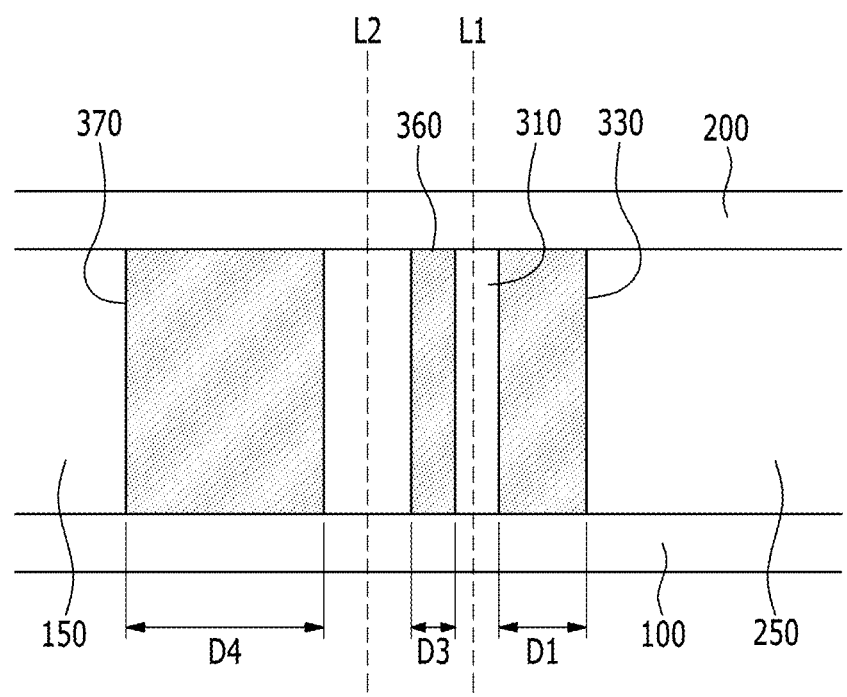
FIG. 7 is a cross-sectional view of the mother substrate assembly of FIG. 6 taken along a line VII-VII.
Figure 8:
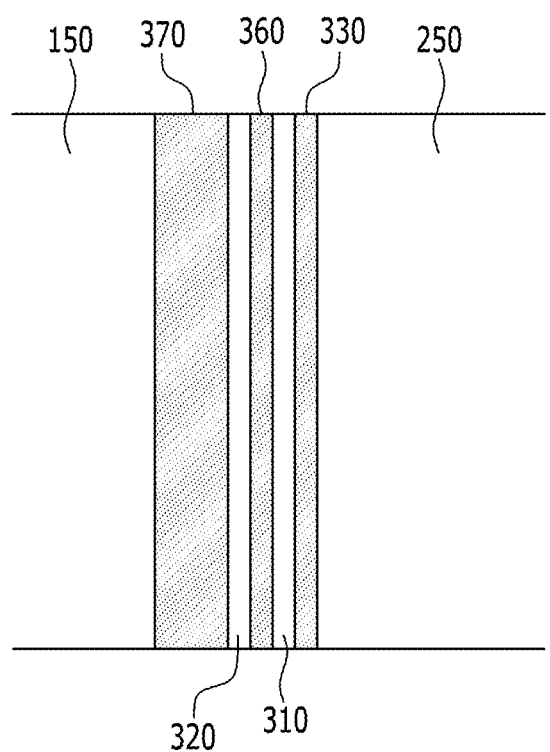
FIG. 8 is an enlarged view of a region A of FIG. 6.

Next, the laser is secondly irradiated to the second sealant portion 350 closer to the display area 150 than the first laser irradiation position of the sealant. FIG. 6 is a view of a mother substrate assembly secondly irradiated with a laser. FIG. 7 is a cross-sectional view of the mother substrate assembly of FIG. 6 taken along a line VII-VII. FIG. 8 is an enlarged view of a region displayed by A of FIG. 6.

Referring to FIG. 6, the second laser irradiation is directed to the side closer to the display area 150 than the first laser irradiation. Since the first laser irradiation is directed at a portion of the sealant 300 adjacent to the dummy region 250, the second laser irradiation may be performed according to the center portion of the original sealant 300, that is, a portion of the second sealant portion 350.

A portion of the second sealant portion 350 irradiated with the laser is removed by the second laser irradiation. Referring to FIG. 7, the sealant is carbonized and removed by the laser after the laser is irradiated, and a second space 320 is generated by the removed sealant and the second sealant portion 350 is converted to a third sealant portion 360 and a fourth sealant portion 370. The second space 320 is positioned between the third sealant portion 360 and the fourth sealant portion 370. A width D3 of the third sealant portion 360 which is immediately adjacent to the first space 310, is less than that a width D4 of the fourth sealant portion 370 which is immediately adjacent to the display region 150.

As shown in FIG. 7, the second space 320 is formed at the side closer to the display area than the first space 310 and is formed at the center of the original sealant 300.

Accordingly, after the second laser irradiation, as shown in FIG. 8, the first space 310 close to the dummy region and the second space 320 positioned at the center portion of the original sealant 300 are formed in the sealant 300.

In this case, the gas generated by the removal of the sealant when forming the second space 320 is diffused into the adjacent first space 310. Although not shown, the sealant adjacent to the first space 310 is left forming the first space 310, and accordingly, a groove passing the gas is generated between the second space and the first space. Also, although the lifting is not generated, the first space is adjacent to the second space when forming the second space such that the generated gas is directed toward the first space 310, that is, the dummy region 250, not the direction of the display area 150. Accordingly, the gas formed by the removal of the sealant is not diffused to the display area. When the gas formed by the sealant removal is diffused to the display area, a failure of the liquid crystal panel is generated, and in the case of the cutting method of the liquid crystal panel according to the present exemplary embodiment, the gas formed when removing the sealant is exhausted to the dummy region 250 through the first space 310 such that the gas does not flow into the display area 150.

In FIG. 7 and FIG. 8, the sealant is completely removed to generate the empty space; however the sealant may not be completely removed according to the output of the laser and the process conditions. In this case, a portion of the sealant may remain in the second space 320. However, the sealant of the portion contacting the first mother substrate 100 and the second mother substrate 200 is removed or damaged such that the sealant is no longer adhered to the mother substrate assembly.

Figure 9:
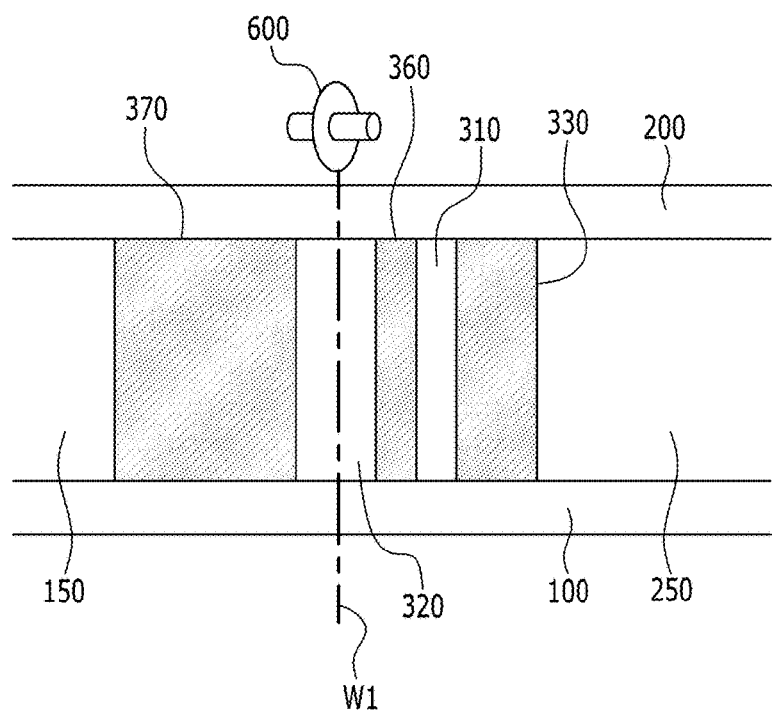
FIG. 9 and FIG. 10 are views showing a cutting process using a wheel.
Figure 10:
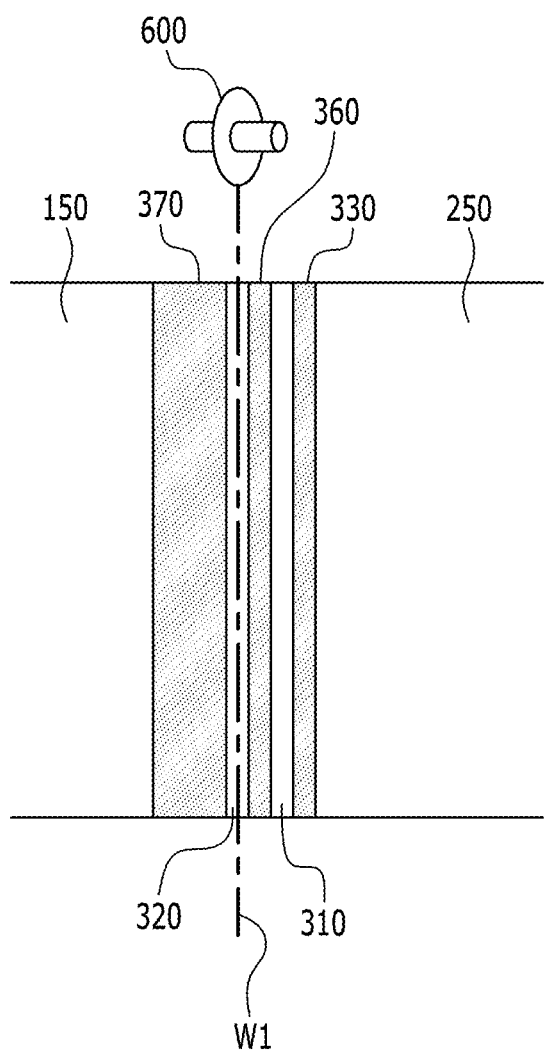

Next, the combined mother substrate is cut according to the second laser irradiation region. FIG. 9 and FIG. 10 are views showing a cutting process using a wheel.

In this case, a cutting line W1 is formed where the wheel passes the region formed with the second laser irradiation, that is, on the second space 320. The cutting may be performed by a method of scribing the mother substrate assembly for each unit liquid crystal panel by using the wheel 600. The wheel may be a cutting wheel formed of a high hardness material such as a diamond.

Shown in FIG. 9 and FIG. 10, the wheel passes on the second space 320 of the empty space generated after the second laser irradiation. Accordingly, since the wheel passes the region in which the sealant is removed, the crack due to the adhesion of the sealant and the mother substrate is not generated and the substrate is clearly cut. In the state that the sealant is formed between the mother substrates, when the cutting is performed while the wheel passes on the sealant, the stress is generated by the adherence of the sealant and the mother substrate, thereby generating the crack. Accordingly, the incision surface may not be uniform; however in the cutting method of the panel according to an exemplary embodiment of the present invention, the cutting wheel passes on the space in which the sealant is removed through the panel such that the crack of the incision surface may be prevented.

As described above, in the cutting method according to an exemplary embodiment of the present invention, the region passed by the wheel is the center of the sealant such that a size of the bezel may be reduced. Also, since the sealant is removed in the region where the wheel passes, the crack due to the adhesion of the sealant and the mother substrate assembly may be prevented. Also, the laser to remove the sealant is irradiated two times such that the space exhausting the gas is firstly formed and the gas does not flow inside the display area.

Next, an effect of the cutting method of the panel according to an exemplary embodiment of the present invention will be described along with a comparative example.

Figure 11:
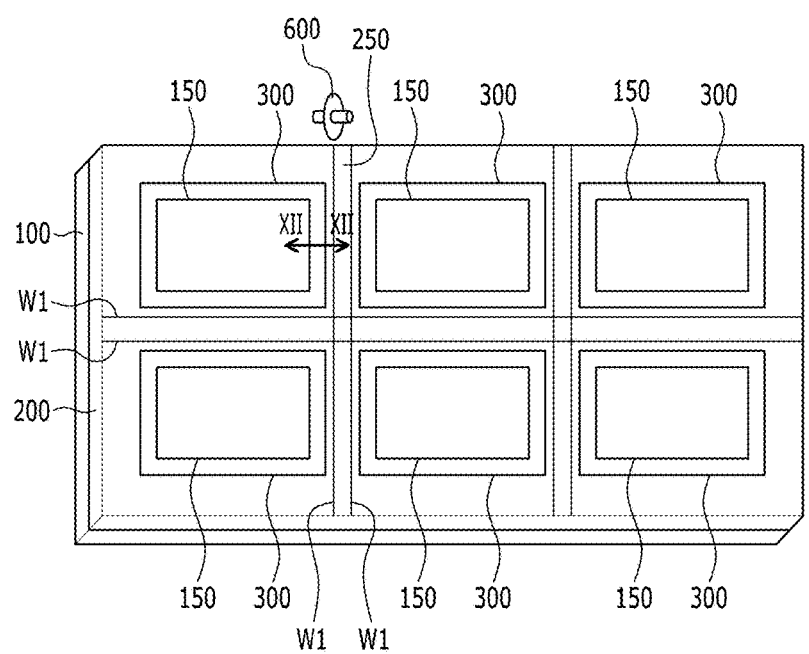
FIG. 11 is a view of a cutting method of a panel according to a comparative example of the present invention.
Figure 12:
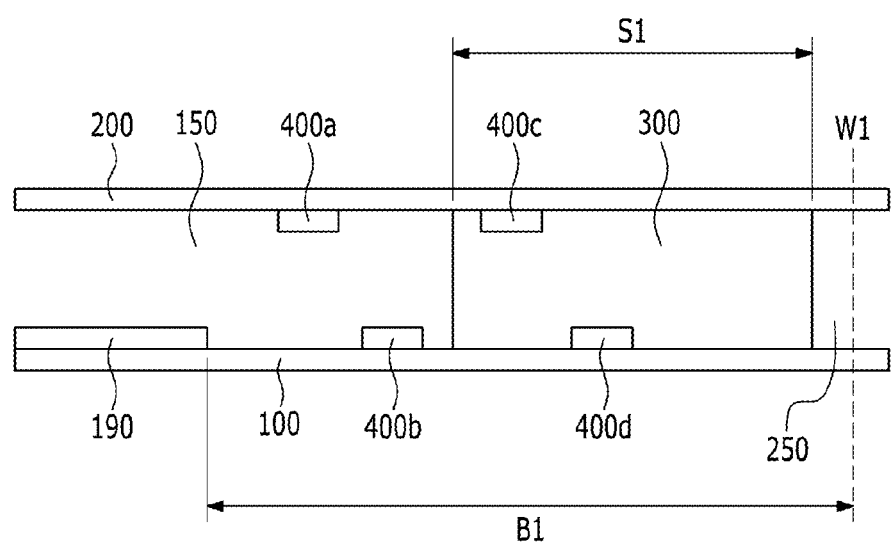
FIG. 12 is a cross-sectional view of the panel of FIG. 11 taken along a line XII-XII.

FIG. 11 is a view of a cutting method of a panel according to a comparative example of the present invention. FIG. 12 is a cross-sectional view of the panel of FIG. 11 taken along a line XII-XII. Referring to FIG. 11 and FIG. 12, in the cutting method of the panel according to the comparative example of the present invention, the cutting line W1 does not overlap the sealant 300 and is positioned outside the sealant formation region.

Accordingly, as shown in FIG. 12, the width S1 of the sealant maintains the same width that is firstly formed, and the length B1 of the bezel is formed wider than the dam formation region and the sealant formation region.

In general, the width S1 of the sealant is more than 0.6 mm, and the length of the entire bezel is more than 1.2 mm.

However, in the cutting method of the panel according to an exemplary embodiment of the present invention, the cutting line W1 is formed by the wheel passing over the region where the sealant 300 is originally formed such that the width of the bezel may be reduced.

Figure 13:
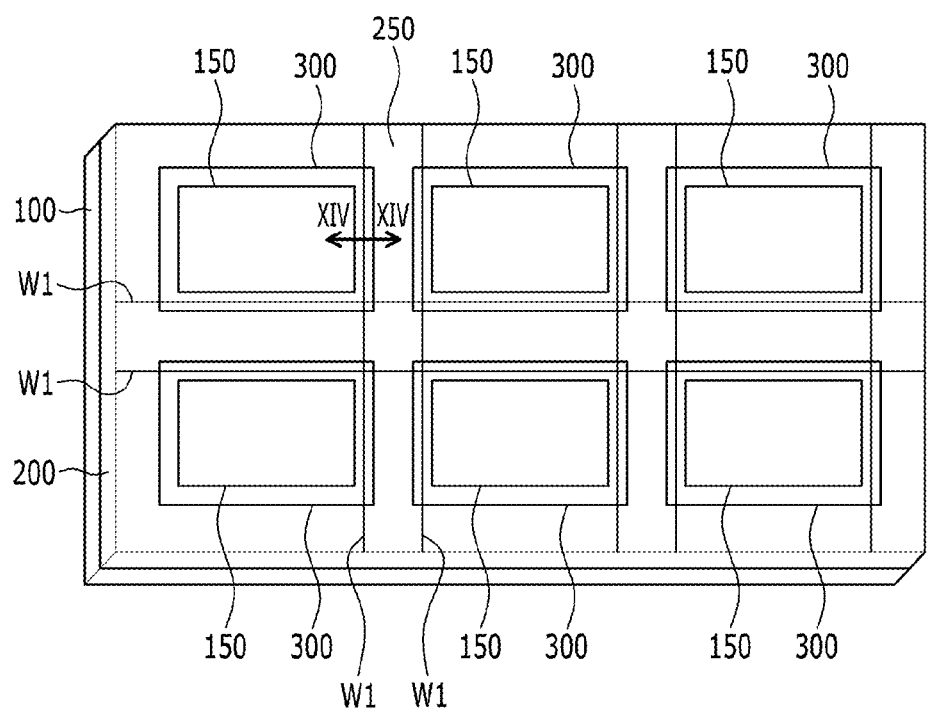
FIG. 13 is a view of a cutting line W1 in a cutting method of a panel according to a comparative example of the present invention.
Figure 14:
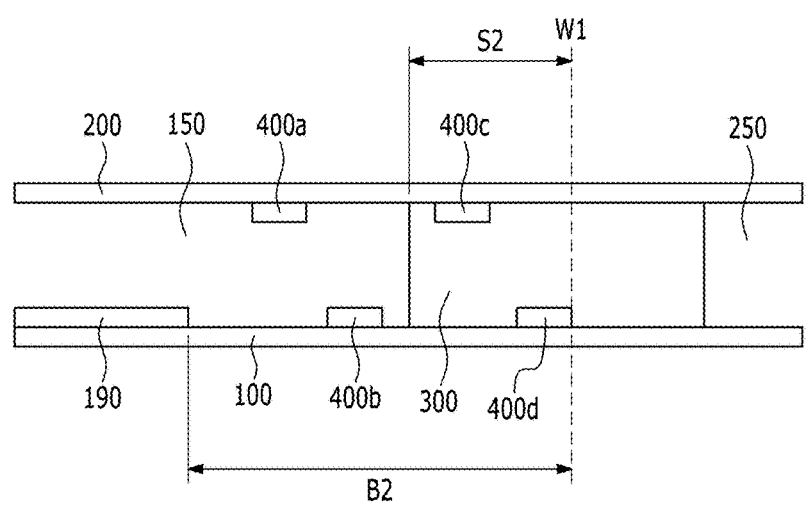
FIG. 14 is a cross-sectional view of the panel of FIG. 13 taken along a line XIV-XIV.

FIG. 13 is a view of a cutting line W1 in a cutting method of a panel according to a comparative example of the present invention. FIG. 14 is a cross-sectional view of the panel of FIG. 11 taken along a line XIV-XIV.

Referring to FIG. 13 and FIG. 14, the wheel cuts in the region in which the sealant is formed. In this case, the region through which the wheel passes is the region in which the dam 400d is not formed, as shown in FIG. 14.

As shown in FIG. 14, since the cutting line W1 transverses the sealant, the width S2 of the bezel is decreased compared with the comparative example illustrated in FIGS. 11 and 12. That is, the width S2 of the sealant remaining in the cut panel is narrower than the width S1 of the sealant that is firstly formed, and it may be confirmed that the length B2 of the bezel of the cut panel is narrow compared with that of FIG. 12.

As shown in FIG. 14, the cutting wheel traverses the center of the sealant, the width S2 of the sealant remained in the cut panel may be less than 0.3 mm. Also, when cutting the liquid crystal panel according to the exemplary embodiment of the present invention, the length B2 of the entire bezel may be less than 0.7 mm.

However, when cutting the panel through the region formed with the sealant, the crack due to the adhesion of the sealant and the mother substrate assembly is generated and the non-uniform cutting line is generated.

Figure 15:
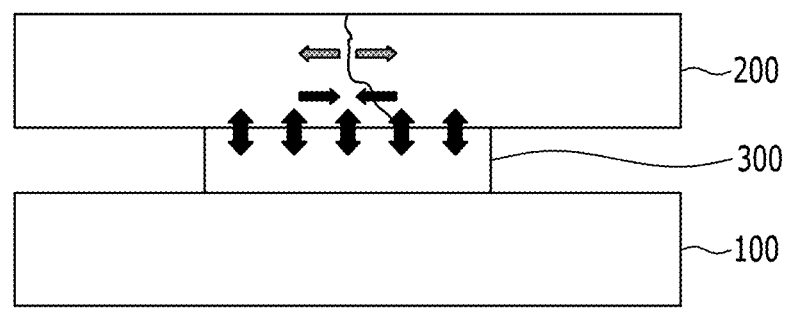
FIG. 15 is a view of a stress and a crack of a cutting line generated when cutting a sealant.

FIG. 15 is a view of a stress and a crack of a cutting line generated when cutting a sealant. Referring to FIG. 15, when cutting the mother substrate assembly formed with the sealant, the stress is generated by the adherence of the sealant 300 and the mother substrates 100 and 200, and the sealant and the mother substrate assembly are not uniformly cut because of this stress and the crack is generated near the incision surface. The cutting is not uniformly generated because of this crack and the incision surface may be irregular.

However, in the cutting method of the liquid crystal panel according to the present exemplary embodiment, the sealant 300 of the region through which the wheel cutting line W1 passes is removed by the laser irradiation such that the empty spaces 310 and 320 are formed. Accordingly, since the wheel passes through the space in which the sealant 300 is removed, the stress caused by the adhesion of the sealant 300 and the mother substrates 100 and 200 and the crack according thereto are not generated.

Figure 16:
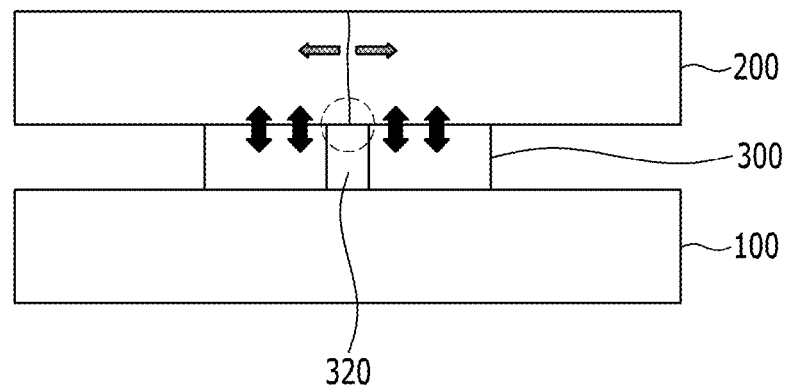
FIG. 16 is a view of a stress generated when cutting a sealant formed with an empty space by laser irradiation.

FIG. 16 is a view of a stress generated when cutting a sealant formed with an empty space by laser irradiation. Referring to FIG. 16, the wheel passes though the empty space 320 in which the sealant is removed such that the stress due to the adhesion between the sealant 300 and the mother substrate 100 and 200 is not generated. Accordingly, the cut is uniform and is formed in a straight line. Accordingly, the uniform cutting may be obtained through the sealant cutting while minimizing the bezel.

However, the gas is generated by the removal of the sealant in the process of removing by irradiating the laser, and this gas may flow into the display area.

Figure 17:
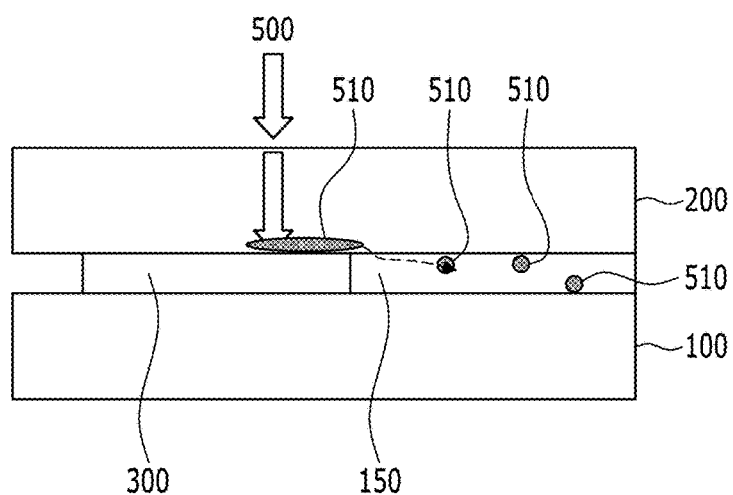
FIG. 17 is a view of a gas generated in a sealant removal process through laser irradiation and an inflow path of a gas.

FIG. 17 is a view of a gas generated in a sealant removal process through a laser irradiation and an inflow path of a gas.

Referring to FIG. 17, the sealant is removed by laser irradiation 500, and in this case, the sealant 300 is an organic material and the gas 510 is generated by the sealant removal. This gas 150 flows inside the display area 150 through an interface of the sealant 300 and the mother substrate.

Figure 18:
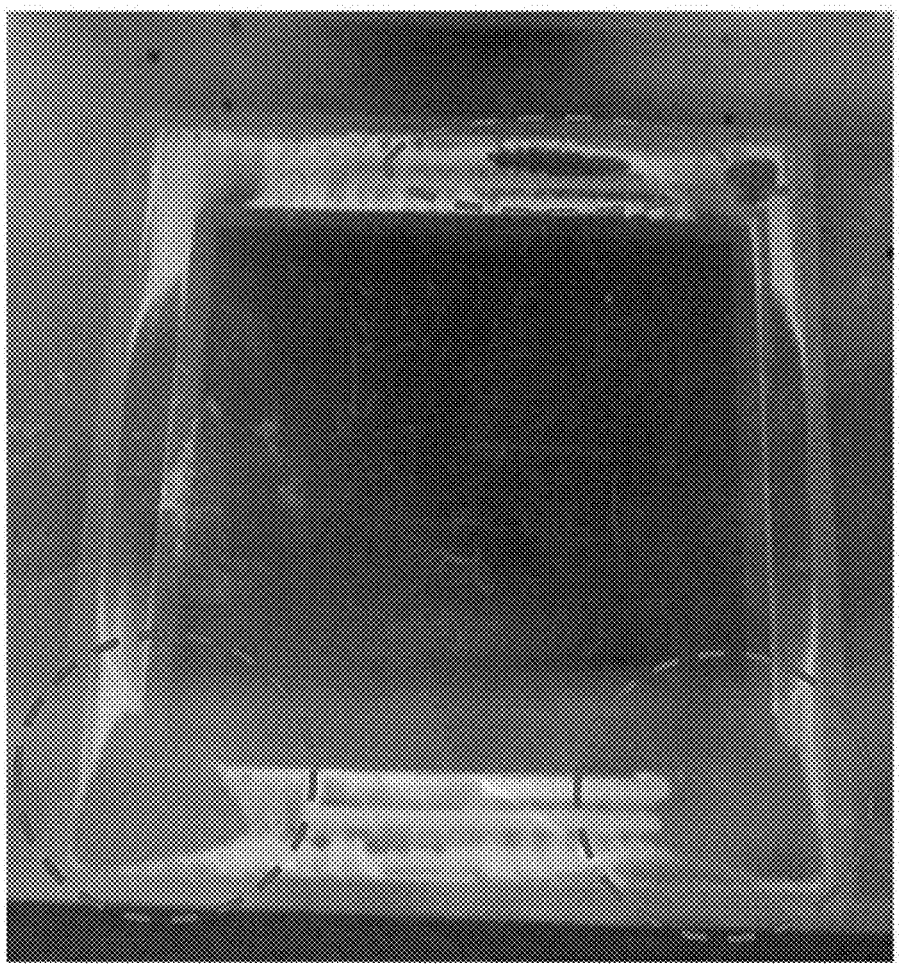
FIG. 18 is a view of an actual image in which a gas flows into a display area after cutting a liquid crystal panel.

FIG. 18 is a view of an actual image in which a gas flows inside a display area after cutting a liquid crystal panel. Referring to FIG. 18, portions indicated by cycles in FIG. 18 show that the gas generated in the removal process of the sealant by the laser flows into the display area.

However, the cutting method of the liquid crystal panel according to an exemplary embodiment of the present invention performs at least two laser irradiations such that the gas formed by the sealant removal does not flow into the display area. That is, the laser is irradiated to the sealant region where the cutting wheel does not pass to exhaust the gas such that the generated gas is discharged into the dummy region.

Figure 19:
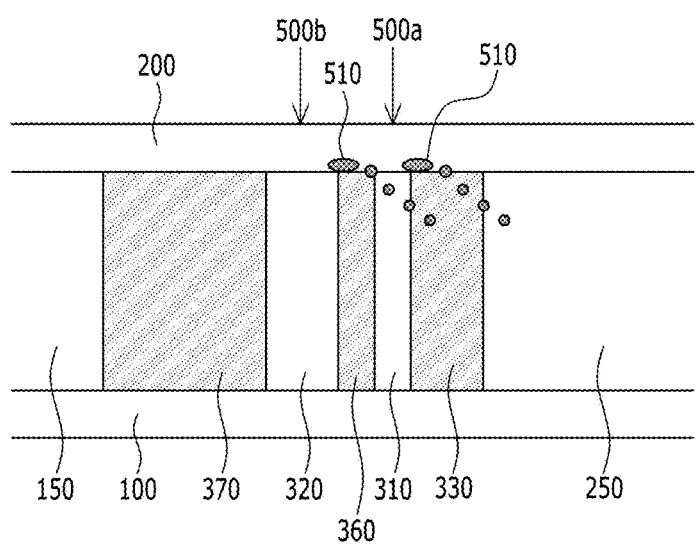
FIG. 19 is a view of a moving path of a gas generated in a cutting process of a liquid crystal panel according to an exemplary embodiment of the present invention.

FIG. 19 is a view of a moving path of a gas generated in a cutting process of a liquid crystal panel according to an exemplary embodiment of the present invention.

Referring to FIG. 19, the cutting method of the liquid crystal panel according to the present invention firstly irradiates the laser to the sealant of the side close to the dummy region 250 to remove the sealant. At this time, the first space 310 is generated by the first laser irradiation and the first space is positioned at the side that is farther from the display area 150 and is closer to the dummy region 250 with respect to the center of the sealant.

Accordingly, the gas 510 generated during the first laser irradiation 500a is discharged to the side of the dummy region 250 since the first space 310 is closer to the dummy region 250, as shown in FIG. 19.

Next, the second laser irradiation 500b is performed at the side closer to the display area 150 than the first laser irradiation 500a and at the center region of the original sealant 300.

In this case, the gas 510 generated in the second laser irradiation 500b is exhausted to the side of the first space 310 since the first space 310 is already formed by the first laser irradiation at the side of the dummy region 250.

Also, in the formation process of the first space 310 by the first laser irradiation, the surrounding sealant 300 is slightly left and the groove passing the gas is formed by lifting. Accordingly, the gas generated in the second laser irradiation more easily moves to the side of the first space 310.

As described above, the gas generated in the formation of the second space 320 by the second laser irradiation is moved to the side of the first space 310 formed by the first laser irradiation and passes through the first space, and is then only discharged to the side of the dummy region 250.

Accordingly, the gas does not flow into the display area 150 such that the failure of the liquid crystal display due to the gas inflow may be prevented.

Figure 20:
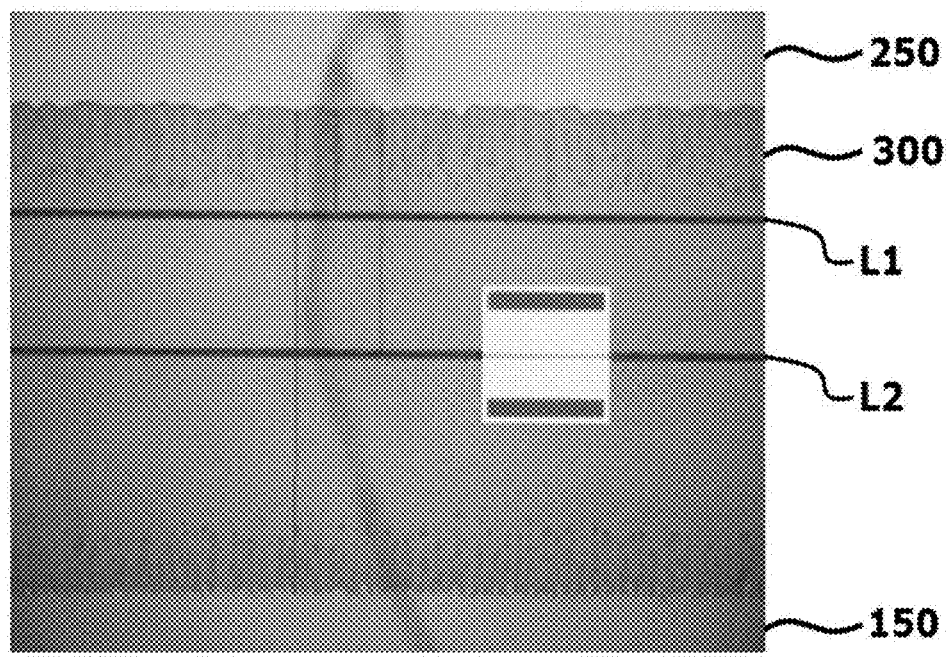
FIG. 20 is a view of an image after a laser is secondly irradiated to a sealant like an exemplary embodiment of the present invention.

FIG. 20 is a view of an image after a laser is secondly irradiated to a sealant like an exemplary embodiment of the present invention.

Referring to FIG. 20, the sealant 300 is formed between the display area 150 and the dummy region 250, and the first space (indicated by a black line) is formed by the first laser irradiation L1 at the side closer to the dummy region 250 of the sealant.

Also, the second space (indicated by a black line) formed by the second laser irradiation L2 is formed at the center of the sealant. Next, the liquid crystal panel is cut while the cutting wheel passes over the second space.

As described above, the gas generated when forming the first space flows into the dummy region 250 that is positioned to be close thereto, and the gas generated when forming the second space flows into the adjacent first space to be discharged to the dummy region 250, and thereby the gas may be prevented from flowing into the display area 150.

As described above, the cutting method of the liquid crystal panel according to an exemplary embodiment of the present invention minimizes the length of the bezel by cutting the region in which the sealant is formed. Also, the crack generation of the incision surface by the adherence of the sealant and the mother substrate may be prevented by removing the sealant under the region through which the cutting wheel passes through laser irradiation.

Also, by firstly forming the empty space through the laser irradiation at the portion close to the dummy region of the sealant, the gas generated in the sealant during the laser irradiation is thereby prevented from flowing inside the display area.

Next, another exemplary embodiment of the present invention will be described.

Figure 21:
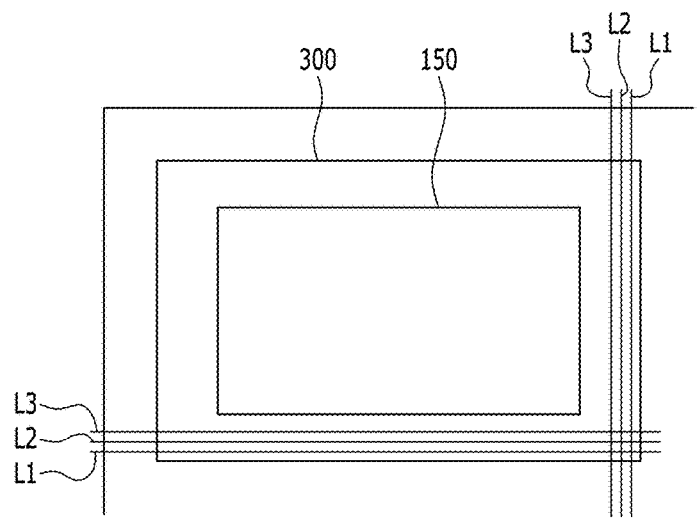
FIG. 21 is a view of laser irradiation of a sealant according to another exemplary embodiment of the present invention.

FIG. 21 is a view of a laser irradiation of a sealant according to another exemplary embodiment of the present invention. Referring to FIG. 21, the cutting method of the liquid crystal panel according to the present exemplary embodiment irradiates the laser three times.

That is, in the previous exemplary embodiment, the first space discharging the gas is formed through the first laser irradiation, and the second space where the cutting wheel actually passes is formed through the second laser irradiation. However, the cutting method of the liquid crystal panel according to the present exemplary embodiment forms the first space discharging the gas through the first laser irradiation and forms the second space discharging the gas through the second laser irradiation. Next, the third space where the cutting wheel passes is formed through third laser irradiation.

Accordingly, the cutting method of the liquid crystal panel according to the present exemplary embodiment increases the space discharging the gas by two times, thereby further preventing the gas flow into the display area.

Also, in the present exemplary embodiment, the laser is thirdly irradiated, however the laser may be irradiated more than three times. That is, a plurality of empty spaces may be formed by a plurality of laser irradiations between the center space of the sealant where the cutting wheel actually passes and the dummy region.

Figure 22:
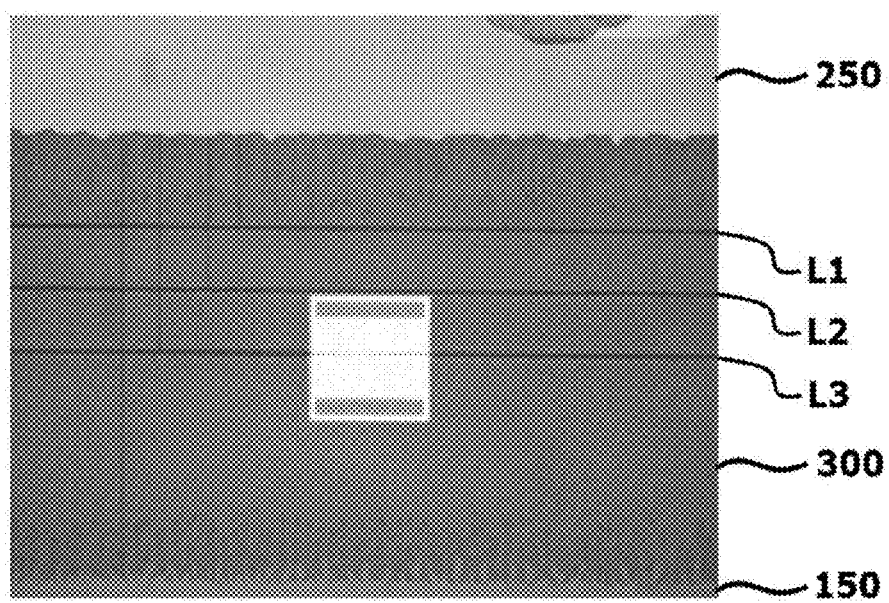
FIG. 22 is a view of an image after a laser is thirdly irradiated to a sealant like an exemplary embodiment of the present invention.

FIG. 22 is a view of an image after a laser is thirdly irradiated to a sealant like an exemplary embodiment of the present invention. Referring to FIG. 22, the sealant 300 is formed between the display area 150 and the dummy region 250, and sequentially the first laser irradiation L1, the second laser irradiation L2, and the third laser irradiation L3 are performed from the side closer to the dummy region and the spaces (indicated by the black lines) due thereto are formed.

In this case, the cutting wheel passes according to the third space formed under the region of the third laser irradiation L3, and the gas is discharged through the space formed under the region of the first laser irradiation L1 and the second laser irradiation L2. Accordingly, the gas generated on the laser irradiation for the sealant does not flow into the display area.

Figure 23:
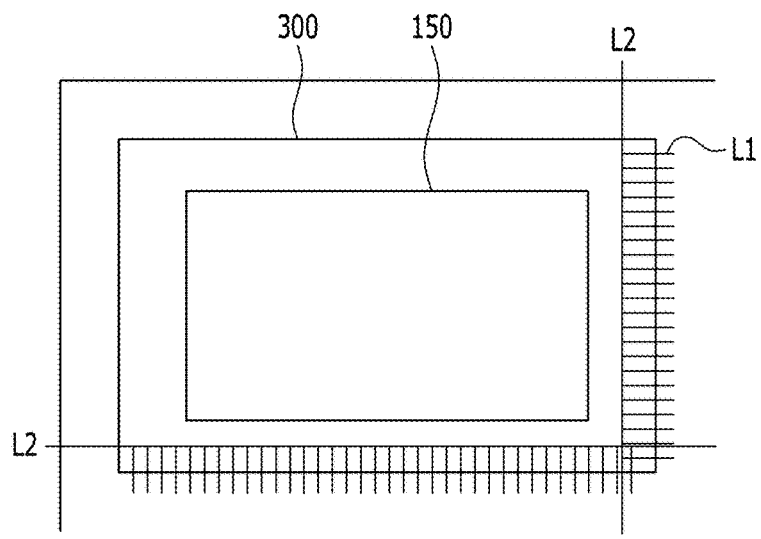
FIG. 23 is a view of a laser irradiation of a sealant according to another exemplary embodiment of the present invention.

Next, another exemplary embodiment of the present invention will be described. FIG. 23 is a view of laser irradiation of a sealant according to another exemplary embodiment of the present invention. Referring to FIG. 23, in the cutting method of the liquid crystal panel according to an exemplary embodiment of the present invention, the first laser irradiation is performed perpendicular to the direction of the second laser irradiation.

That is, as shown in FIG. 23, the first laser irradiation is performed in the direction from the center of the sealant toward the dummy region. In this case, the direction of the first laser irradiation is perpendicular to the direction of the second laser irradiation and the progressing direction of the cutting wheel.

After the first laser irradiation, the first space is formed in the sealant along the first laser irradiation line L1. In this case, as shown in FIG. 23, the first laser irradiation line is connected from the sealant center to the boundary of the dummy region such that the first space is opened to the dummy region.

Accordingly, the gas generated in the sealant removal process due to the first laser irradiation is entirely discharged to the dummy region according to the first space that is opened to the dummy region 250.

Next, the second laser irradiation is formed perpendicular to the first laser irradiation along one edge of the first laser irradiation line. In this case, the gas generated in the second laser irradiation is discharged through the first space formed through the first laser irradiation to the dummy region. Accordingly, the gas generated by the removal of the sealant in the second laser irradiation does not flow into the display area 150.

Next, the mother substrate assembly is cut by using the cutting wheel along the empty space formed under the second laser irradiation line L2.

Figure 24:
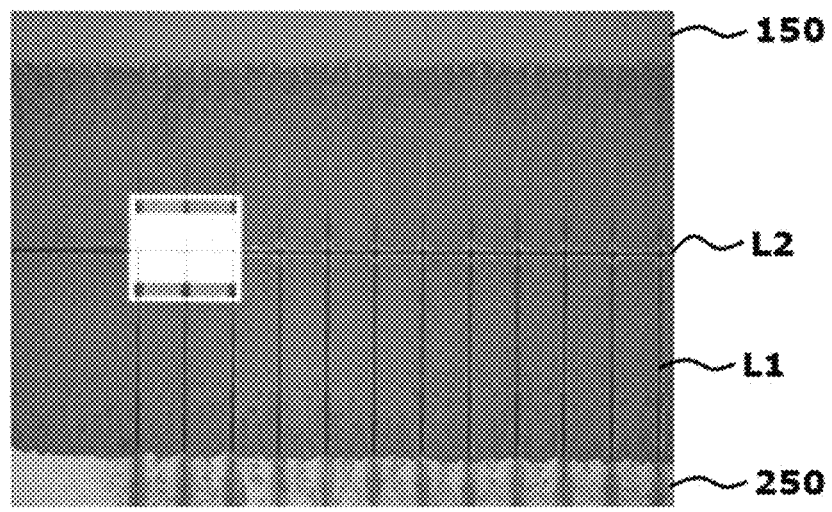
FIG. 24 is a view after a laser is irradiated to a mother substrate assembly according to an exemplary embodiment of the present invention.
Figure 24:
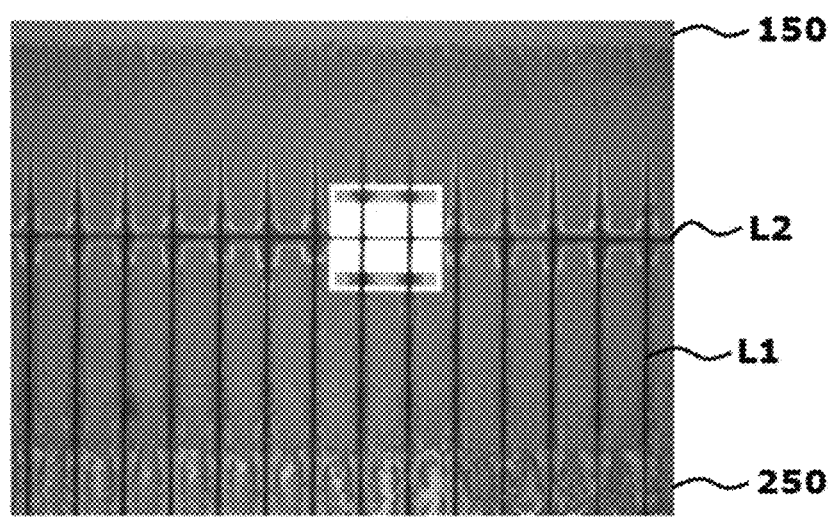

FIG. 24 is a view after a laser is irradiated to a mother substrate assembly according to an exemplary embodiment of the present invention. FIG. 24 (*a*) is an image when the output of the laser is 20%, and FIG. 24 (*b*) is an image when the output of the laser is 50%.

Referring to FIG. 24, the sealant 300 is formed between the display area 150 and the dummy region 250, and the first laser irradiation L1 is performed in the direction perpendicular to the progressing direction of the sealant from the center in the sealant near the dummy region 250. Also, the second laser irradiation L2 is formed in the direction perpendicular to the first laser irradiation L1, and the liquid crystal panel is cut while passing the cutting wheel over the space (indicated by the black line) formed through the second laser irradiation.

Figure 25:
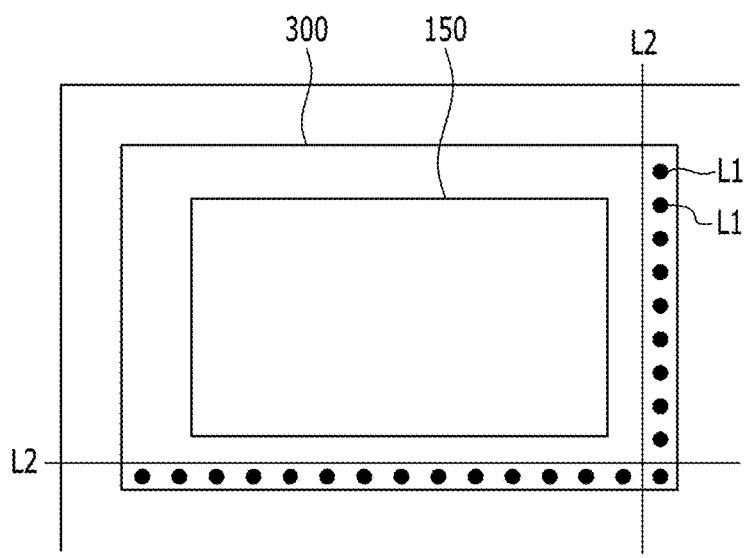
FIG. 25 is a view of laser irradiation of a sealant according to another exemplary embodiment of the present invention.

As shown in FIG. 24 and FIG. 25, the empty space formed through the first laser irradiation L1 is connected to the dummy region 250. Accordingly, the gas generated when removing the sealant by the first laser irradiation is discharged to the dummy region 250. Also, since the second laser irradiation line L2 crosses the first laser irradiation line L1, the empty space formed by the second laser irradiation is also connected to the empty space formed by the first laser irradiation, so the gas generated in the second laser irradiation is also discharged to the dummy region 250. Accordingly, the gas formed by the removal of the sealant does not flow into the display area and the cutting wheel passes on the region where the sealant is removed by the second laser irradiation such that the crack is not generated. Also, the cutting traverses the sealant such that the bezel may be minimized.

Next, another exemplary embodiment of the present invention will be described. FIG. 25 is a view of laser irradiation of a sealant according to another exemplary embodiment of the present invention. Referring to FIG. 25, in the cutting method of the liquid crystal panel of the present exemplary embodiment, the first laser irradiation is not continuously performed along the sealant, but is performed with a separated island shape.

That is, as shown in FIG. 25, the first laser irradiation is performed with a plurality of separated dots as a hole is drilled in the sealant and along the edge of the sealant. In this case, the region where the first laser irradiation is performed in the sealant is the region adjacent to the dummy region 250.

The first space discharging the gas is formed through the first laser irradiation.

Next, the second laser irradiation is performed to the side closer to the display area than the first laser irradiation region. The second space where the cutting wheel passes is formed through the second laser irradiation, and in this case, the gas is discharged to the dummy region through the first space. The cutting wheel cuts the liquid crystal panel while passing over the second space.

That is, in the case of the cutting of the liquid crystal panel according to the present exemplary embodiment, the gas generated in the first laser irradiation is also discharged to the adjacent dummy region 250, and the gas generated in the secondary laser irradiation is discharged to the dummy region 250 through the empty space formed by the first laser irradiation. Accordingly, the gas generated by the sealant removal does not flow into the display area 150.

Figure 26:
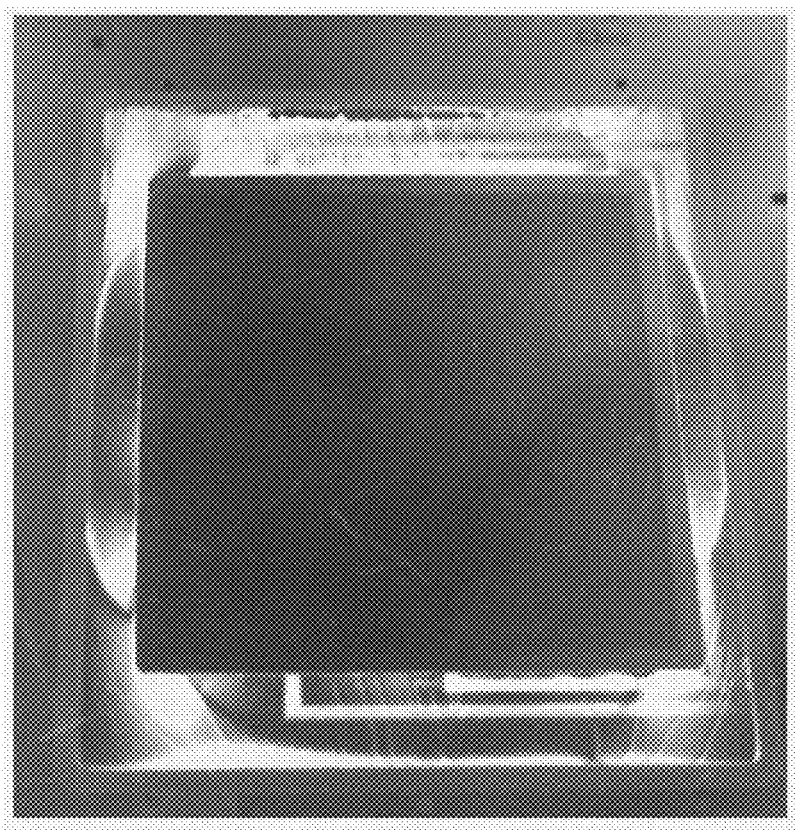
FIG. 26 is a view of an image in which a gas does not flow into a display area after cutting a liquid crystal panel according to an exemplary embodiment of the present invention.

FIG. 26 is an image showing the liquid crystal panel cut along the laser irradiation region after irradiating a plurality of lasers according to an exemplary embodiment of the present invention. Referring to FIG. 26, it may be confirmed that the gas does not flow into the display area.

As stated above, FIG. 18 is an image showing the liquid crystal panel cut according to the comparative example of the present invention. In the comparative example of the present invention, the laser is irradiated once and the panel is cut along the laser irradiation region. Referring to FIG. 18, it may be confirmed that the gas flows near the cutting region (the region indicated by the dotted line). However, in the case of FIG. 26, the gas never flows near the cutting line.

Accordingly, the cutting method of the liquid crystal panel according to an exemplary embodiment of the present invention cuts the region formed with the sealant when cutting the unit liquid crystal panel in the mother substrate, thereby minimizing the bezel. Also, by previously removing the sealant of the region that the cutting wheel passes by the laser, the crack generation by the adherence of the sealant and the mother substrate is prevented. Also, by previously irradiating the laser to the sealant adjacent to the dummy region, the gas generated when irradiating the laser to the sealant does not flow into the display area and is discharged into the dummy region.

Figure 27:
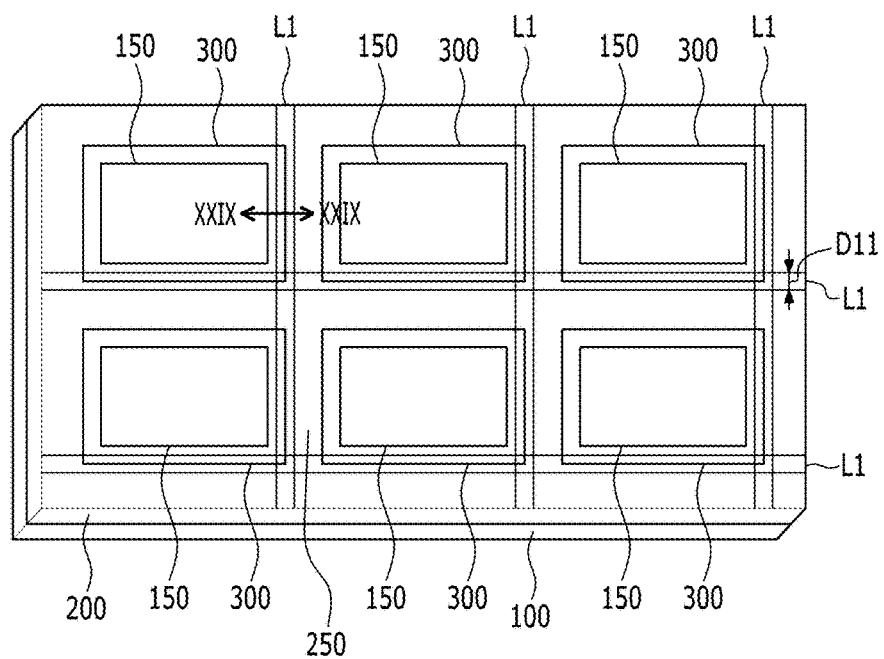
FIG. 27 and FIG. 28 are views of a cutting method of a liquid crystal panel according to another exemplary embodiment of the present invention.
Figure 28:
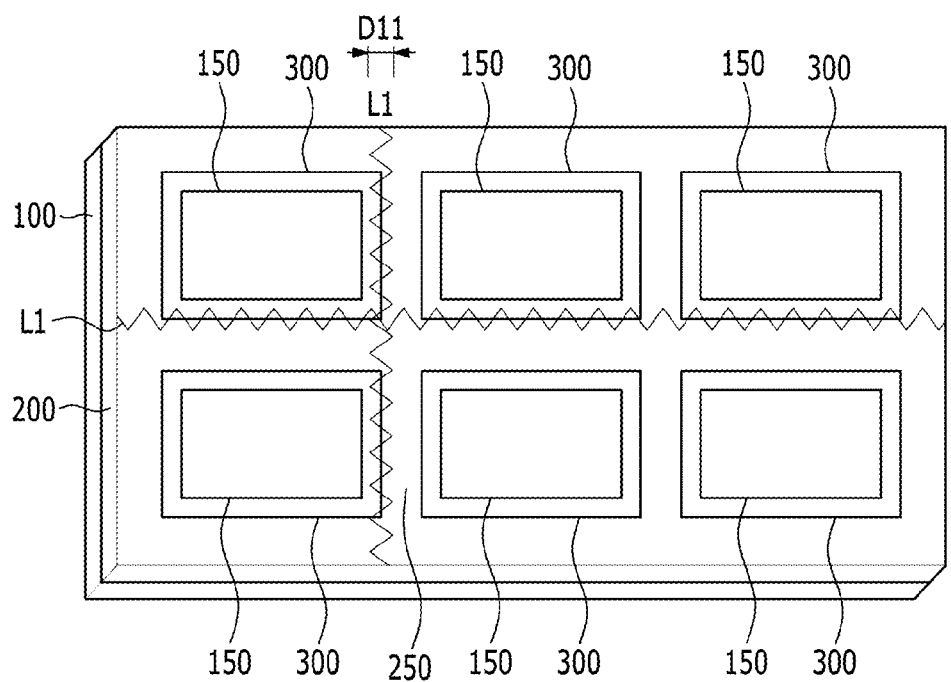

Next, another exemplary embodiment of the present invention will be described. FIG. 27 and FIG. 28 are views of a cutting method of a liquid crystal panel according to another exemplary embodiment of the present invention. The cutting method of the liquid crystal panel according to the present exemplary embodiment is similar to the cutting method of the liquid crystal panel according to the previous exemplary embodiment. The detailed description for the same constituent elements is omitted.

However, the cutting method of the liquid crystal panel according to the present exemplary embodiment does irradiate the plurality of lasers like the previous exemplary embodiment. That is, in the previous exemplary embodiment, the laser is firstly irradiated near the dummy region of the sealant, and the laser is secondly irradiated to the center of the sealant to be cut along the secondary laser irradiation region by the cutting wheel.

However, the cutting method of the liquid crystal panel according to the present exemplary embodiment irradiates the laser having a wide width instead of the irradiation of the plurality of lasers.

Referring to FIG. 27, the laser is irradiated to the sealant by using a laser L1 having a width D11. At this time, the width D11 of the laser is wider than the length from the center of the sealant to the dummy region. Accordingly, the portion from the center of the sealant to the dummy region is simultaneously removed in the laser irradiation. In the previous exemplary embodiment, the empty space is generated inside the sealant, however in the present exemplary embodiment, the area from the center of the sealant to the dummy region is entirely removed.

Accordingly, the gas formed by the sealant removal is directly discharged to the side of the dummy region in the removed portion and does not flow into the display area. Next, the cutting using the wheel is performed through the region where the sealant is removed such that the crack by the adherence of the sealant and the mother substrate is not generated.

FIG. 28 shows the cutting method of the liquid crystal panel according to another exemplary embodiment of the present invention. In FIG. 28, the sealant is removed by using the laser having a right-left vibration width D11. That is, the irradiation method of the laser according to the exemplary embodiment of FIG. 28 is similar to the irradiation method of the laser according to the exemplary embodiment of FIG. 27. However, the irradiation of the laser according to the exemplary embodiment of FIG. 27 removes the sealant by using the laser having the width D11, and the irradiation of the laser according to the exemplary embodiment of FIG. 28 removes the sealant by using the vibration width D11 of the laser.

In this case, the sealant is removed with a similar shape to the case of FIG. 27. Accordingly, the gas generated by the sealant removal is discharged to the dummy region 250 at once and does not flow into the display area.

Also, the sealant is not completely removed according to the vibration width and the output of the laser, and the empty space may be formed in the sealant according to the laser irradiation line shown by L1 in FIG. 28. Even though the sealant is not completely removed like this, referring to FIG. 28, the laser irradiation line L1 is connected to the dummy region such that the generated gas is discharged to the dummy region 250 and does not flow into the display area 150.

Figure 29:
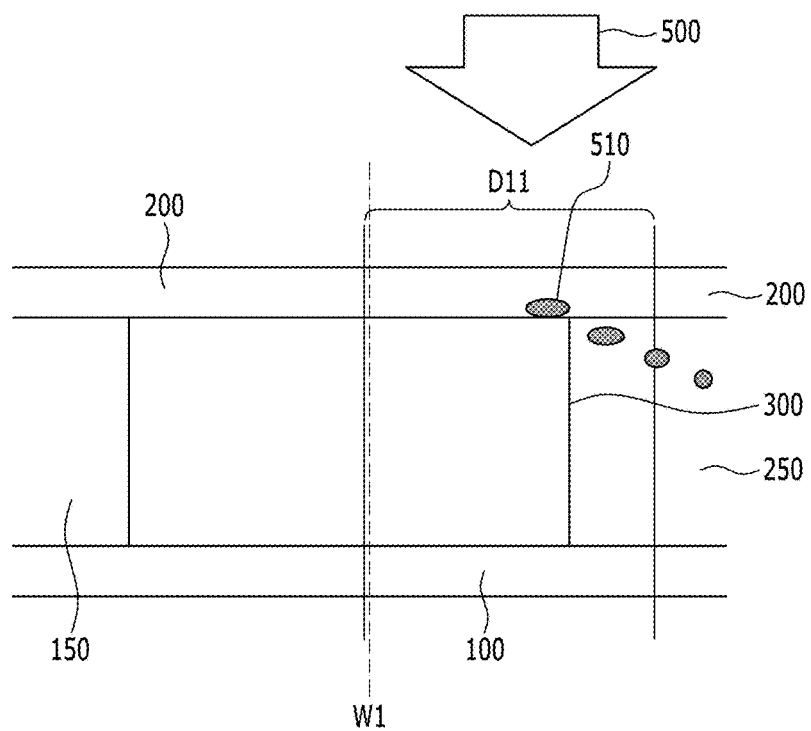
FIG. 29 is a cross-sectional view of the mother substrate assembly of FIG. 27 taken along a line XXIX-XXIX.

FIG. 29 is a cross-sectional view of the mother substrate assembly of FIG. 27 taken along a line XXIX-XXIX. Referring to FIG. 27, the laser irradiation 500 has the width D11 and irradiates from the center of the sealant 300 to the dummy region 250 at once. Accordingly, the area of more than half is removed at once with reference to the center of the sealant 300.

In this case, the gas 510 generated in the removal process of the sealant is discharged from the removed sealant region to the side of the dummy region 250. Accordingly, the gas 510 does not flow into the display area.

Next, as shown in FIG. 29, the cutting using the cutting wheel is executed. In this case, the cutting line W1 where the cutting wheel passes is the region in which the sealant is removed, and is positioned to be close to the sealant that is not removed and remains to minimize the bezel.

The sealant of the region D11 that is irradiated by the laser may not be completely removed and may partially remain according to the laser output and the process conditions. However, in this case, the crack is generated by the damage to the sealant such that the gas is discharged to the side of the dummy region 250, and the adherence of the sealant and the mother substrate is removed in the laser irradiation region such that the crack is also not generated in the case of the cutting by the wheel.

As described above, the cutting method of the liquid crystal panel according to an exemplary embodiment of the present invention cuts the region formed with the sealant when cutting the unit liquid crystal panel, thereby minimizing the bezel. Also, by previously removing the sealant of the region where the cutting wheel passes, the crack generation because of the adherence of the sealant and the mother substrate is prevented.

Further, by previously irradiating the laser to the sealant of the region close to the dummy region to form the space, the gas generated when irradiating the laser to the sealant does not flow into the display area and is discharged to the dummy region.

In addition, by using the laser having the irradiation width of more than the half of the sealant width to remove the sealant, the gas generated when irradiating the laser does not flow into the display area and is discharged to the dummy region.

Accordingly, while minimizing the bezel of the liquid crystal display, the crack is not generated in the incision surface in the cutting, and the failure in which the gas flows inside the display device may be suppressed.

Next, the mother substrate assembly according to an exemplary embodiment of the present invention will be described.

The description of the mother substrate assembly according to the present exemplary embodiment is the same as the description of the mother substrate assembly used in the cutting process of the liquid crystal panel according to the exemplary embodiment of the present invention that is previously described. The detailed description for the same constituent elements is omitted.

As described above, the mother substrate assembly according to the present invention includes the first mother substrate and the second mother substrate formed with a plurality of unit liquid crystal panels and the sealant formed between the first mother substrate and the second mother substrate and combining the first and the second mother substrates, wherein the sealant encloses the circumference of each unit liquid crystal panel and may include the first irradiation line formed in the sealant and the second irradiation line formed in the sealant of the side closer to the unit liquid crystal panel than the first irradiation line.

In this case, the irradiation line is formed through the laser irradiation like the previous exemplary embodiment. The sealant under the first irradiation line and the second irradiation line is completely removed through the laser irradiation to form the empty space, or the sealant is partially removed or damaged such that the adherence with the mother substrate may be lost.

FIG. 6 shows the mother substrate assembly according to an exemplary embodiment of the present invention. As shown in FIG. 6, in the mother substrate assembly according to an exemplary embodiment of the present invention, the first irradiation line and the second irradiation line may be parallel to the edges of the unit liquid crystal panel.

FIG. 21 shows the mother substrate assembly according to another exemplary embodiment of the present invention. Referring to FIG. 21, the mother substrate assembly according to the current exemplary embodiment of the present invention may include the third irradiation line L3 formed in the sealant 300 at the side closer to the display area 150 than the first irradiation line L1 and the second irradiation line L2.

FIG. 23 shows the mother substrate assembly according to another exemplary embodiment of the present invention. Referring to FIG. 23, the second irradiation line L2 is a straight line parallel to each edge of the unit liquid crystal panel, and the first irradiation line L1 is perpendicular to the second irradiation line L2 and may be a plurality of short lines formed in the direction from the center of the sealant toward the outside of the sealant. That is, groove of a shape such as a comb is formed in a direction from the center of the sealant farther from the liquid crystal panel FIG. 25 shows the mother substrate assembly according to another exemplary embodiment of the present invention, and referring to FIG. 25, the first irradiation line L1 of the mother substrate assembly according to the present exemplary embodiment is a plurality of disconnected points formed according to the edge of the sealant 300, while the second irradiation line L2 may be the straight line parallel to each edge of the unit liquid crystal panel.

In the exemplary embodiment of the present invention, the distance from the sealant to the second irradiation line L2 may be less than 0.3 mm. Further, in the exemplary embodiment according to FIG. 21, the distance from the sealant to the third irradiation line may be less than 0.3 mm.

FIG. 27 shows the mother substrate assembly according to another exemplary embodiment of the present invention. Referring to FIG. 27, the mother substrate assembly according to the present exemplary embodiment includes the first mother substrate and the second mother substrate formed with a plurality of unit liquid crystal panels and the sealant formed between the first mother substrate and the second mother substrate and combining the mother substrates, wherein the sealant encloses the circumference of each unit liquid crystal panel, and the area from the center of the sealant to the edge farther from the unit liquid crystal panel is completely removed or partially removed such that the adherence with the mother substrate is lost.

FIG. 28 shows the mother substrate assembly according to another exemplary embodiment of the present invention. Referring to FIG. 28, the mother substrate assembly according to the present exemplary embodiment includes the first mother substrate and the second mother substrate formed with a plurality of unit liquid crystal panels and the sealant formed between the first mother substrate and the second mother substrate and combining the mother substrates, wherein the sealant encloses the circumference of each unit liquid crystal panel, and the first irradiation line that starts from the edge of the sealant, has a repeated zigzag shape to the center of the sealant, and progresses according to the formation direction of the sealant.

In the exemplary embodiment of the present invention, the distance from the sealant to the first irradiation line may be less than 0.3 mm.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mother substrate assembly, comprising:
a first mother substrate and a second mother substrate formed with a plurality of unit liquid crystal panels; and
a plurality of sealants formed between and combining the first mother substrate and the second mother substrate, each of the plurality of unit liquid crystal panels being enclosed by a different sealant among the plurality of sealants,
wherein a first sealant among the plurality of sealants seals liquid crystal molecules within a circumference of a first unit liquid crystal panel among the plurality of unit liquid crystal panels, the first sealant comprising:
a first irradiation line formed therein;
a second irradiation line formed therein, the second irradiation line being closer to the first unit liquid crystal panel than at least a majority of the first irradiation line;
a third irradiation line formed in the first sealant, the third irradiation line being closer to the first unit liquid crystal panel than the first irradiation line and the second irradiation line; and
an outer edge, the at least the majority of the first irradiation line and the second irradiation line being closer to the outer edge than the first unit liquid crystal panel.

2. The mother substrate assembly of claim 1, wherein the first irradiation line and the second irradiation line are empty spaces in which the first sealant is at least partially removed or damaged such that adherence of corresponding portions of the first sealant with the first mother substrate and the second mother substrate is lost.

3. The mother substrate assembly of claim 1, wherein the first irradiation line and the second irradiation line are straight lines parallel to an edge of the first unit liquid crystal panel.

4. The mother substrate assembly of claim 1, wherein:
the second irradiation line is a straight line parallel to an edge of the first unit liquid crystal panel; and
the first irradiation line is perpendicular to the second irradiation line, the first irradiation line comprising a plurality of short lines formed in a direction from a central portion of the first sealant toward the outer edge of the first sealant.

5. The mother substrate assembly of claim 1, wherein:
the first irradiation line comprises a plurality of disconnected points formed along the outer edge of the first sealant; and
the second irradiation line is a straight line parallel to an edge of the first unit liquid crystal panel.

6. The mother substrate assembly of claim 1, wherein a distance from the circumference of the first unit liquid crystal panel to the second irradiation line is less than 0.3 mm.

7. A mother substrate assembly, comprising:
a first mother substrate and a second mother substrate formed with a plurality of unit liquid crystal panels; and
a sealant formed between and combining the first mother substrate and the second mother substrate,
wherein the sealant seals liquid crystal molecules in a first unit liquid crystal panel among the plurality of unit liquid crystal panels, the sealant comprising a sealant portion extending in a first direction along a first edge of the first unit liquid crystal panel disposed between second edges of the first unit liquid crystal panel, and
wherein the sealant portion is at least partially removed in an area extending, in a second direction crossing the first direction, from a central region of the sealant portion to an edge of the sealant portion farther from the first unit liquid crystal panel than the central portion such that adherence of the area of the sealant portion with the first mother substrate and the second mother substrate is lost, the area of the sealant portion being disposed between the second edges of the first unit liquid crystal panel.

8. A mother substrate assembly, comprising:
a first mother substrate and a second mother substrate formed with a plurality of unit liquid crystal panels; and
a sealant formed between and combining the first mother substrate and the second mother substrate,
wherein the sealant encloses a circumference of at least one unit liquid crystal panel among the plurality of unit liquid crystal panels, and
wherein the sealant comprises a first irradiation line comprising a repeating zigzag pattern starting from an edge of the sealant to a center of the sealant and back to the edge of the sealant, the repeating zigzag pattern progressing along a formation direction of the sealant.

9. A method comprising:
preparing a combined mother substrate for cutting into unit liquid crystal panels, the combined mother substrate comprising:
a first mother substrate;
a second mother substrate opposing the first mother substrate; and
a sealant combining the first mother substrate and the second mother substrate, the sealant enclosing a first unit liquid crystal panel among the plurality of unit liquid crystal panels;
irradiating a laser to the sealant to form a first irradiated region in the sealant; and
irradiating, after formation of the first irradiated region, the laser to a region of the sealant closer to the first unit liquid crystal panel than a position of the first irradiated region to form a second irradiated region in the sealant, the first irradiated region being configured to channel a byproduct of the formation of the second irradiated region away from the first unit liquid crystal panel.

10. The method of claim 9, wherein:
the sealant is one of a plurality of sealants combining the first mother substrate and the second mother substrate, each of the plurality of sealants enclosing a different unit liquid crystal panel among the plurality of unit liquid crystal panels; and
the mother substrate is divided into a plurality of display areas inside the plurality of sealants and a dummy region outside the plurality of sealants.

11. The method of claim 9, further comprising:
cutting the combined mother substrate in and along the second irradiation region such that the first irradiated region forms a portion cut away from the first unit liquid crystal panel.

12. The method of claim 10, wherein:
the byproduct is gas; and
the gas is discharged to the dummy region via the first irradiated region.

13. The method of claim 9, wherein:
the first irradiated region forms a linear shape along a progressing direction of the sealant; and
the first irradiated region and the second irradiated region are parallel to each other.

14. The method of claim 13, further comprising:
irradiating, after formation of the first irradiated region and prior to formation of the second irradiated region, the laser to a region of the sealant to form a third irradiated region in the sealant, the third irradiated region being disposed between the first irradiated region and the second irradiated region.

15. The method of claim 9, wherein:
the first irradiated region extends from a circumference of the sealant to a central portion of the sealant and terminates prior to the first unit liquid crystal panel;
the second irradiated region extends a direction perpendicular to the first irradiated region along a progressing direction of the sealant; and
formation of the second irradiated region causes, at least in part, a comb-shaped groove to be formed in the sealant in a direction from the central portion of the sealant to the circumference of the sealant.

16. The method of claim 9, wherein:
formation of the first irradiated region causes, at least in part, a plurality of island shaped grooves spaced apart from one another to be formed along a progressing direction of the sealant; and
the second irradiated region is formed parallel to a progressing direction of the plurality of grooves.

17. The method of claim 11, wherein, after cutting the combined mother substrate, a width of a remaining portion of the sealant is less than 0.3 mm.

18. A method comprising:
preparing a combined mother substrate for cutting into unit liquid crystal panels, the combined mother substrate comprising:
a first mother substrate;
a second mother substrate opposing the first mother substrate; and
a sealant combining the first mother substrate and the second mother substrate, the sealant enclosing a first unit liquid crystal panel among the plurality of unit liquid crystal panels such that a display area is formed inside the sealant and a dummy region is formed outside the sealant; and
removing a portion of the sealant along an edge of the first unit liquid crystal panel using a laser beam, a width of an irradiated region along the edge being less than a width of the sealant and greater than a width from a center of the sealant to the dummy region, an area of the combined mother substrate corresponding to the portion of removed sealant providing a cut line for cutting the first unit liquid crystal panel from the combined mother substrate,
wherein removing the portion of the sealant comprises radiating the laser beam in a repeating first direction and second direction pattern such that first directional transitions in the pattern occur in the dummy region outside the sealant and at least one second directional transition in the pattern overlaps the center of the sealant.

* * * * *